United States Patent
Freeman

(10) Patent No.: US 8,857,507 B2
(45) Date of Patent: Oct. 14, 2014

(54) DOWNHOLE COMMUNICATION SYSTEM AND METHOD

(75) Inventor: James J. Freeman, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 1690 days.

(21) Appl. No.: 11/972,036

(22) Filed: Jan. 10, 2008

(65) Prior Publication Data

US 2009/0178804 A1   Jul. 16, 2009

(51) Int. Cl.
*E21B 47/12* (2012.01)
*G01V 11/00* (2006.01)

(52) U.S. Cl.
CPC .............. *E21B 47/12* (2013.01); *G01V 11/002* (2013.01)
USPC ...................................... 166/65.1; 340/854.9

(58) Field of Classification Search
USPC ............ 340/854.9, 855.2, 855.3; 166/250.01, 166/65.1
See application file for complete search history.

(56) References Cited

U.S. PATENT DOCUMENTS

| | | | |
|---|---|---|---|
| 4,468,665 A | 8/1984 | Thawley et al. | |
| 5,350,018 A | 9/1994 | Sorem et al. | |
| 5,467,083 A | 11/1995 | McDonald et al. | |
| 6,160,492 A | 12/2000 | Herman | |
| 6,847,585 B2 | 1/2005 | Macpherson | |
| 6,993,432 B2 | 1/2006 | Jenkins et al. | |
| 7,261,162 B2 * | 8/2007 | Deans et al. ................... | 166/336 |
| 2005/0270172 A1 * | 12/2005 | Bailey et al. ................ | 340/854.3 |
| 2006/0102341 A1 * | 5/2006 | Freer et al. ................ | 166/250.01 |
| 2006/0262480 A1 * | 11/2006 | Stewart .......................... | 361/251 |
| 2010/0194587 A1 * | 8/2010 | Weerasinghe ............. | 340/854.9 |

FOREIGN PATENT DOCUMENTS

WO    2007/108700 A1   9/2007

OTHER PUBLICATIONS

Juliusoon, E., et al. "Downhole Enthalpy Measurement in Geothermal Wells," Proceedings, 31st Workshop on Geothermal Reservoir Engineering, Stanford University, Stanford, California, Jan. 3-Feb. 1, 2006.
Vermesan, O., et al. "Low Power ASIC for High Temperature Applications," High-Temperature Electronic Materials, Devices and Sensors Conference, Feb. 22-27, 1998, pp. 81-85.
Wang, A., et al. "Optical Fiber Sensor Technologies for Efficient and Economical Oil Recovery," Annual report: Photonics Laboratory, Virginia Polytechnic Institue and State University, Oct. 29, 1999. pp. i-vi, 1-3, 22, 48-50, 56, 59.
Tucker, Cary Dean. "Minimum Mean Squared Error Equalization for Discrete Multi-Tone Modulation," Thesis in Eletrical Engineering submitted to the Graduate Faculty of Texas tech University, Aug. 2002.

(Continued)

*Primary Examiner* — Jennifer H Gay
*Assistant Examiner* — Elizabeth Gitlin
(74) *Attorney, Agent, or Firm* — Cantor Colburn LLP

(57) ABSTRACT

A downhole communication system including a plurality of addressed downhole devices, a plurality of remote devices, and a plurality of conductors. Each of the plurality of conductors is electrically conductively connected to at least one of the plurality of addressed downhole devices and at least one of the plurality of remote devices. The downhole communication system is configured such that at least one of the plurality of devices is able to receive and recognize encoded addresses and encoded data in an electrical signal transmitted to at least one of the plurality of conductors electrically conductively isolated from the device configured to be receptive to the electrical signal having the encoded addresses and encoded data.

20 Claims, 3 Drawing Sheets

(56) References Cited

OTHER PUBLICATIONS

International Searching Authority, Notification of Transmittal of the International Search Report and The Written Opinion of the International Searching Authority, or the Declaration, PCT/US2009/030583, Aug. 19, 2009.

International Searching Authority, Written Opinion of the International Searching Authority, PCT/US2009/030583, Aug. 19, 2009.

International Searching Authority, International Search Report, PCT/US2009/030583, Aug. 19, 2009.

* cited by examiner

DOWNHOLE COMMUNICATION SYSTEM AND METHOD

BACKGROUND OF THE INVENTION

In the hydrocarbon exploration and recovery industry, knowledge about conditions downhole is very valuable. Significant research and development has been engaged in over a large number of years in the quest for more reliable information. Some of the results of such research and development include the deployment of sensors to the downhole environment. These sensors include, among others, pressure and temperature sensors. Common in the art is to enable the communication of data gained by the sensors to the surface. Such communication has been made over a dedicated communication conductor or over the power conductor principally used to power a downhole current driven machine. Some systems utilize multiple sensors having multiple dedicated conductors. Such multiple conductors often lie parallel to one another in close proximity. Such close proximity results in signal coupling or "cross talk" between conductors. Methods to prevent or minimize the cross talk are ongoing with mixed results. An invention that is tolerable of such cross talk would be well received in the art.

BRIEF DESCRIPTION OF THE INVENTION

Disclosed herein is a downhole communication system. The system includes, a plurality of addressed downhole devices, a plurality of remote devices, and a plurality of conductors. Each of the plurality of conductors is electrically conductively connected to at least one of the plurality of addressed downhole devices and at least one of the plurality of remote devices, the downhole communication system is configured such that at least one of the plurality of devices is able to receive and recognize encoded addresses and encoded data in an electrical signal transmitted at least one of the plurality of conductors electrically conductively isolated from the device configured to be receptive to the electrical signal having the encoded addresses and encoded data.

Further disclosed herein is a method of communicating with a downhole device. The method includes, encoding data and an address, electrically transmitting the encoded data and the encoded address over at least one first conductor, coupling the encoded data and the encoded address onto at least one second conductor, and receiving the encoded data and the encoded address from the second conductor.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed system and method are presented herein by way of exemplification and not limitation with reference to the Figures.

Figure 1:
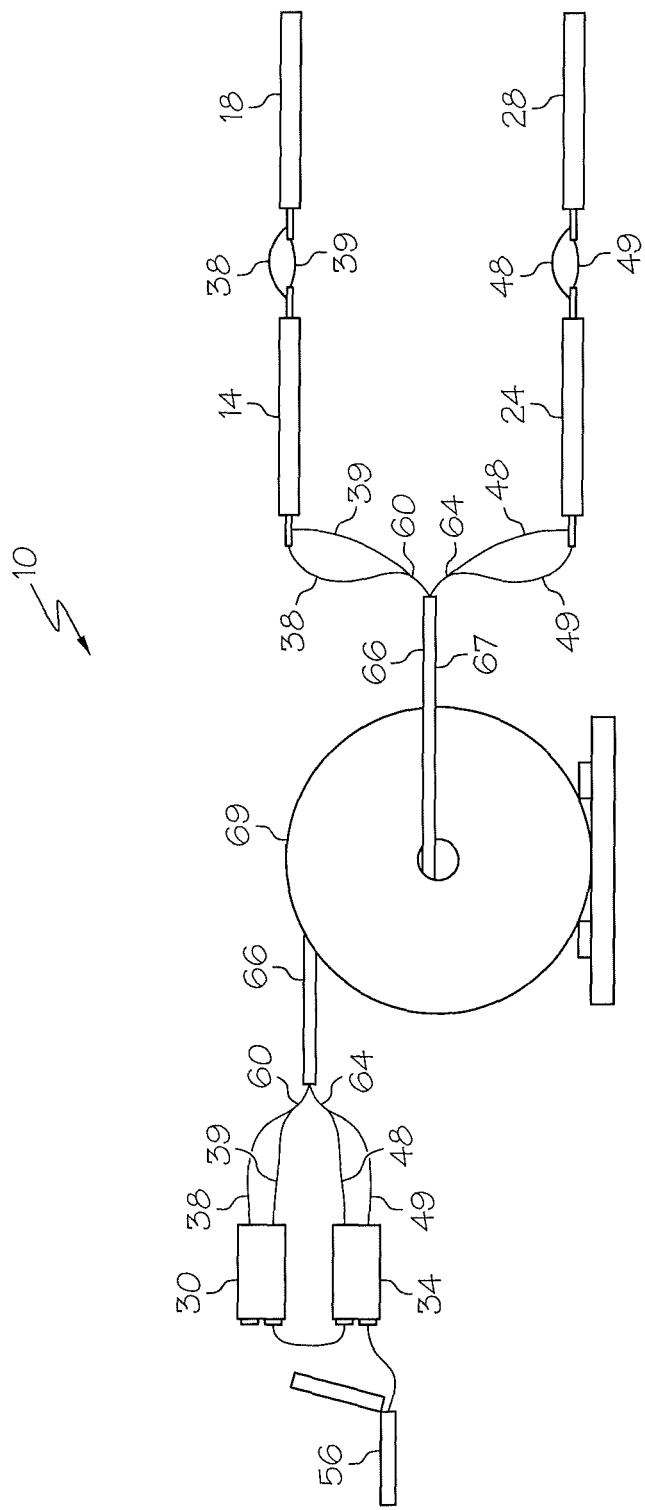
FIG. 1 depicts a downhole communication system.

Referring to FIG. 1, an embodiment of the downhole communication system 10 is illustrated. The downhole communication system 10 includes, a plurality of downhole devices 14, 18, 24 and 28, a plurality of remote devices 30, 34 and a plurality of conductors 38, 39, 48 and 49. This embodiment includes a portion of the conductors 38, 39, 48 and 49 that is windable about a reel 69. The downhole devices 14, 18, 24 and 28, shown herein, are sensors for measuring downhole parameters such as temperature and pressure, for example, but any downhole device that can have information that would be beneficial to communicate to the remote devices 30, 34 may be employed. Each of the downhole devices 14, 18, 24 and 28 is electrically conductively connected to at least one of the remote devices 30, 34 by at least one of the conductors 38, 39, 48 and 49. The remote devices 30, 34 may be at surface or other location such as at a different depth, for example a more shallow depth, than the downhole devices 14, 18, 24 and 28. The remote devices 30, 34 can be interface cards, for example, that transmit data to and receive data from the downhole devices 14, 18, 24 and 28 and create a link to a human interface device 56 such as a computer. Each of the conductors 38, 39, 48, 49 is electrically conductively connected to at least one of the downhole devices 14, 18, 24, 28 and to at least one of the remote devices 30, 34 thereby creating a wired communication link between each of the downhole devices 14, 18, 24, 28 and each of the remote devices 30, 34 to which it is electrically conductively connected.

Due to the number of conductors utilized, and the fact that they are all routed within a single wellbore, it is difficult to space the conductors 38, 39, 48, 49 far enough from one another to prevent signal coupling or "cross talk" between the different conductors 38, 39, 48, 49. Additionally, to protect the conductors, it is often desirable to bundle the conductors 38, 39, 48, 49 together within a protective sheath, thereby further decreasing the separation between the conductors 38, 39, 48, 49 and, consequently, increasing the amount of cross talk further. Embodiments disclosed herein, rather than preventing or diminishing the cross talk, use the cross talk to enhance communications.

Using cross talk to enhance communications is achieved by assigning each of the downhole devices 14, 18, 24, 28 a unique address. By including the address in every electrical transmission made, every device that receives a transmission can recognize the device from which it was sent. As such, a device receiving a transmission can be a device that is not electrically conductively connected to the transmitting device but may instead be receiving the transmission via cross talk between the conductors 38, 39, 48, 49. For example, the downhole device 18 could transmit an encoded electrical signal on the conductor 38, which induces, via electromagnetic fields generated by the signal conducting through the conductor 38, a similar encoded electrical signal to be conducted in the conductor 49. The remote device 34, being electrically conductively connected to the conductor 49, may then receive the encoded electrical signal. As such, the receiving device receives the transmission from a device to which it is not electrically conductively connected. Such cross talk communication works in the opposite direction as well, that is, a transmission from one of the remote devices 30, 34 can be received by any or all of the downhole devices 14, 18, 24, 28.

The communication system 10, therefore, has built in redundancy. In the event of a failure of any one of the devices 14, 18, 24, 28, 30, 34, for example, one or more of the, still operational, remaining devices, via cross talk, can continue to communicate with the failed device. To prevent confounding multiple signals, which can occur due to multiple simultaneous transmissions, it may be desirable to have only one device transmitting at any point in time. Controlling timing of transmission of the devices 14, 18, 24, 28, 30, 34 can be done through, for example, directly commanding which device transmits at any given point in time. Alternately, a time multiplexing arrangement can be employed to prevent multiple simultaneous transmissions.

Referring again to FIG. 1, with each of the downhole devices 14, 18, 24, 28 having a unique address each of the conductors 38, 39, 48, 49 can be electrically conductively connected to multiple downhole devices, as is shown, by the conductors 38 and 39 that are electrically conductively connected to both of the downhole devices 14 and 18. Additionally, the conductors 38, 39, 48, 49 can be routed in various configurations. For example, the conductors 38, 39, 48, 49 can be routed over a portion of their length in coaxial pairs such as in tubing encased conductor (TEC) cables 60, and 64. In the embodiments disclosed herein the TEC cable 60 has the conductors 38 and 39 routed therein while the TEC cable 64 has the conductors 48 and 49 routed therein. A portion of the TEC cables 60, 64 are jointly encased in multi-conductor encapsulation 66 with a protective sheath 67 therearound that is wound upon reel 69.

Figure 2:
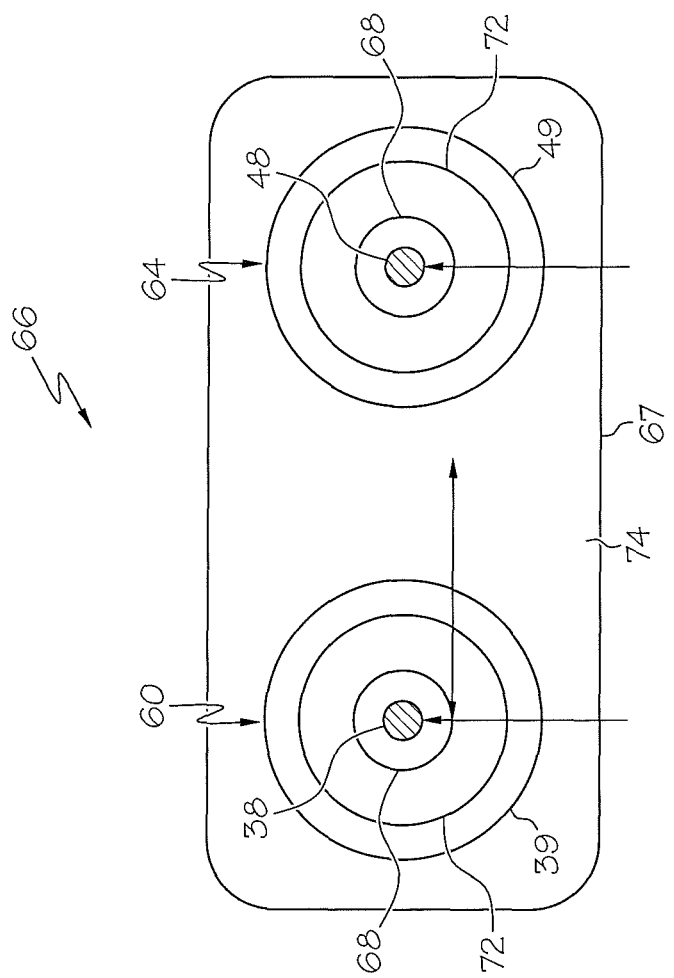
FIG. 2 depicts a cross sectional view of a multi-conductor encapsulation with two tubing encased conductors.

Referring to FIG. 2, the construction of the two TEC cables 60, 64 are illustrated in more detail in cross section of a multi-conductor encapsulation 66. The TEC cable 60, for example, includes one of the conductors 38 at its center, encased by an insulation layer 68 and a filler layer 72. The other conductor 39 forms a protective tubing layer therearound coaxial with the inner conductor 38. Similarly, the TEC cable 64 has the conductor 48 at its center, encased by an insulation layer 68 and a filler layer 72. The conductor 49 forms a protective tubing layer therearound coaxial with the inner conductor 48. Both of the TEC cables 60, 64 are together encased in a multi-conductor encapsulation 66 for further protection and are electrically isolated from one another by insulation 74.

Figure 3:
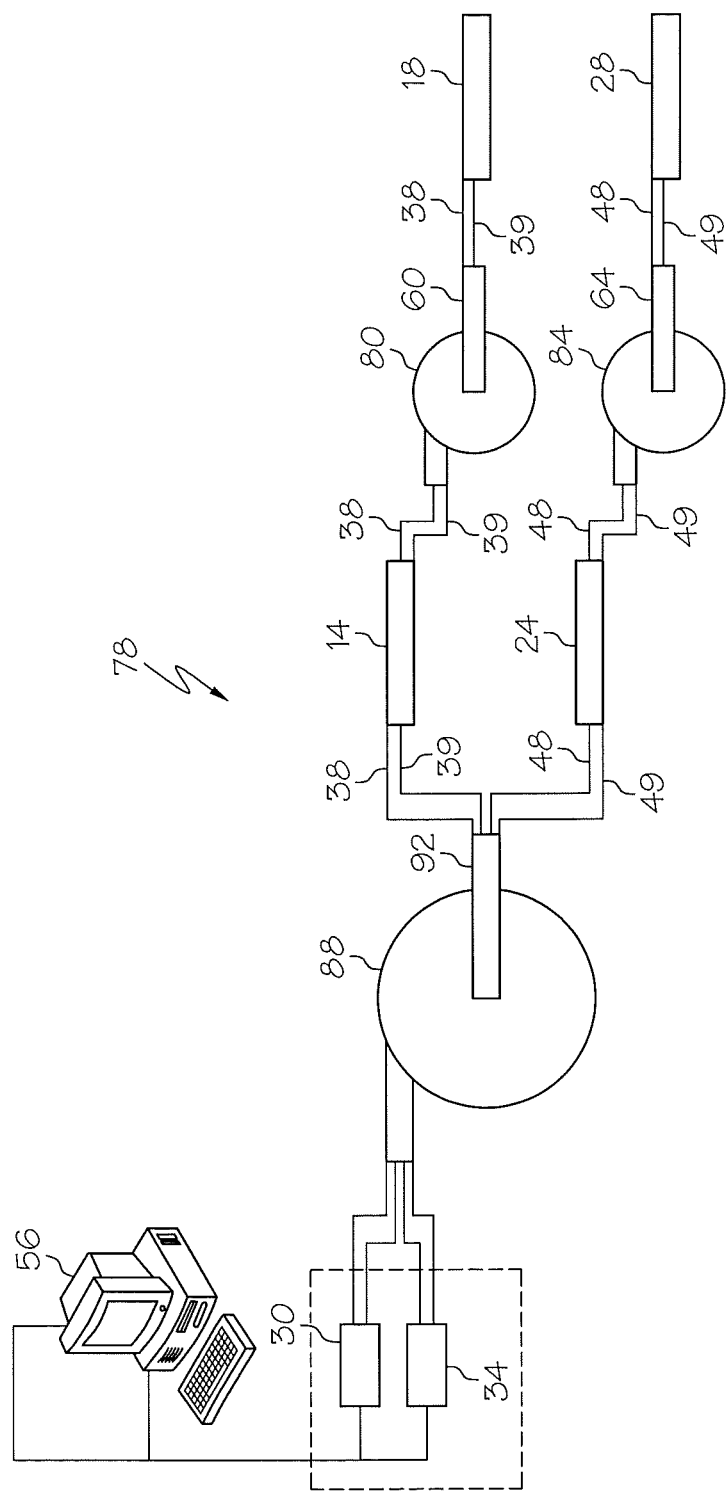
FIG. 3 depicts an alternate downhole communication system disclosed herein.

Referring to FIG. 3, an alternate embodiment of a downhole communication system 78 is illustrated. Similar to the downhole communication system 10 the downhole communication system 78 includes, the plurality of downhole devices 14, 18, 24 and 28, the plurality of remote devices 30, 34 and the plurality of conductors 38, 39, 48 and 49. However, unlike the communication system 10, the communication system 78 has reels 80 and 84 about which the TEC cables 60 and 64 are windable respectively. Such an embodiment may be desirable when, for example, the downhole device 14 and the downhole device 18 are to be positioned a significant distance apart. The embodiment of the communication system 78 also includes a reel 88 about which the plurality of conductors 38, 39, 48 and 49 are windable either within TEC cables or within sheathing 92 without first being configured in a coaxial arrangement as provided by the TEC cable construction.

Both of the downhole communication systems 10, 78 can employ encoding of the data being sent through the conductors 38, 39, 48, and 49. Such encoding may be digital, for example, as is the case with frequency shift keying (FSK). With FSK, digital information is encoded in the presence or absence of one or more current or voltage frequencies imposed on the conductors 38, 39, 48, and 49. One method would be to use one frequency, for example, 10 kHz to represent a digital "0" and another frequency, for example, 14 kHz to represent a digital "1." With this method one can transmit a series of ones and zeroes representing any value by alternatively transmitting a series of intermingled 10 kHz and 14 kHz signals.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A downhole communication system, comprising:
   a plurality of addressed downhole devices;
   a plurality of remote devices; and
   a plurality of conductors, each of the plurality of conductors being electrically conductively connected to at least one of the plurality of addressed downhole devices and at least one of the plurality of remote devices, at least one of the plurality of remote devices being receptive to and recognizing encoded addresses and encoded data in an electrical signal transmitted through at least one of the plurality of conductors electrically conductively isolated from the one of the plurality of remote devices.

2. The downhole communication system of claim 1, wherein the plurality of remote devices and the plurality of addressed downhole devices are further configured to transmit non-simultaneously.

3. The downhole communication system of claim 2, wherein a time multiplexed arrangement controls the timing of the non-simultaneous transmissions.

4. The downhole communication system of claim 1, wherein at least one of the conductors is a tubing encased conductor.

5. The downhole communication system of claim 1, wherein at least one of the plurality of downhole devices is a sensor.

6. The downhole communication system of claim 5, wherein the sensor measures at least one downhole parameter including at least one of temperature and pressure.

7. The downhole communication system of claim 1, wherein at least one of the plurality of remote devices is an interface card.

8. The downhole communication system of claim 1, wherein at least one of the plurality of remote devices is at surface.

9. A method of communicating with a downhole device, comprising:
   encoding data and an address;
   electrically transmitting the encoded data and the encoded address over at least one first conductor;
   coupling the encoded data and the encoded address onto at least one second conductor that is electrically conductively isolated from the at least one first conductor; and
   receiving the encoded data and the encoded address from the second conductor.

10. The method of claim 9, wherein the encoding is through frequency shift keying.

11. The method of claim 9, wherein the coupling the encoded data and address onto at least one second conductor is from the at least one first conductor.

12. The method of claim 9, wherein the electrically transmitting the encoded data and the encoded address over at least one first conductor is between at least one first downhole device and at least one first remote device to which the at least one first conductor is electrically conductively connected.

13. The method of claim 12, wherein the transmitting is from a transmitting device that is at least one of the first downhole device and the at least one first remote device.

14. The method of claim 12, wherein the receiving is by a receiving device that is at least one of at least one second downhole device and at least one second remote device.

15. The method of claim 14, wherein the receiving device is electrically conductively connected to the second conductor.

16. The method of claim 15, further comprising assigning each first downhole device a device address.

17. The method of claim 16, wherein the transmitting the encoded address includes transmitting the device address of the downhole device.

18. The method of claim 17, further comprising recognizing the device address by the receiving device.

19. The method of claim 9, further comprising time multiplexing the transmitting.

20. The method of claim 9, further comprising controlling the devices so that only one device is transmitting at any specific time.

* * * * *